United States Patent Office 3,539,386
Patented Nov. 10, 1970

3,539,386
WOOD TREATING PROCESS AND PRODUCT
Arthur G. Janssen, Edina, Minn., assignor to General
Mills, Inc., a corporation of Delaware
No Drawing. Filed Oct. 31, 1968, Ser. No. 772,415
Int. Cl. B27k *3/50;* B44d *1/28*
U.S. Cl. 117—116
16 Claims

ABSTRACT OF THE DISCLOSURE

Wood is impregnated with a solution of a polyisocyanate and a derivative of a diisocyanate derived from dimerized fat acids and a dialdimine or diketimine of an aliphatic polyamine containing two primary amine groups and one secondary amine group. The resulting treated wood has improved dimensional stability to moisture.

---

The present invention relates to a process for treating wood to render the same more dimensionally stable to moisture. More particularly, it relates to such a process wherein the wood is impregnated with a solvent solution of a polyisocyanate and a derivative of a diisocyanate derived from dimerized fat acids and certain dialdimines and diketimines. It also relates to the stabilized wood product.

Wood, especially softwoods such as fir, pine, spruce, redwood, and the like, tends to be dimensionally unstable when exposed to moisture. Thus the wood fibers swell and, after long exposure, ultimately rot. This instability has been conventionally countered by coating the surface of the wood with various paints, coatings and the like. Where the coatings are uniform and leave no exposed surface, they are successful in countering the dimensional instability due to moisture. However, it is not always possible to obtain a completely impervious coating and also the cost of applying and maintaining such coatings is often relatively high. Where moisture is able to penetrate or otherwise reach the wood under the coating, swelling takes place with subsequent peeling of the coating and ultimately rotting of the wood itself. It would be highly desirable to treat the wood to improve the stability of the wood itself and thus reduce the necessity of having an absolutely impermeable coating thereon.

It is accordingly an object of the present invention to treat wood in such a manner as to render the same more dimensionally stable to moisture. A further object of the invention is to provide wood which is stabilized to the effects of moisture. These and other objects will become apparent from the following detailed description of the invention.

I have now discovered that the stability of wood to the effects of moisture can be greatly improved by impregnating the wood with a solvent solution of a polyisocyanate and a derivative of a diisocyanate derived from dimerized fat acids and certain dialdimines or diketimines. While I do not fully understand the mechanism of the improved results, one possible theory is that the indicated active reactants used in my process in some way react with the wood fibers and thus prevent the swelling thereof on exposure to moisture. Another possible explanation is that the two reactants produce a polymer in the layers of wood fibers which polymer prevents moisture from reaching the fibers. It is, of course, possible that these two actions are occurring simultaneously. Despite the exact action or theory involved, my process does provide substantially improved wood products.

The diisocyanates to be used in preparing the derivatives are derived from dimerized fat acids. Such diisocyanates have the following idealized structural formula:

$$OCN(CH_2)_y—D—(CH_2)_yNCO$$

where $y$ is 0 or 1 and D is the divalent hydrocarbon group of the dimerized fat acid. The diisocyanates of the above formula wherein $y$ is 0 are prepared by converting the dimerized fat acids to the corresponding dimeric acid chlorides, reacting the acid chlorides with a metal azide to form the dimeric acyl azides and then heating the acyl azides to produce the diisocyanates. This method of preparation can be conveniently illustrated by the following equations:

$$3HOOC—D—COOH + 3PCl_3 \longrightarrow 3ClOC—D—COCl + 2H_3PO$$
$$ClOC—D—COCl + 2NaN_3 \longrightarrow N_3OC—D—CON_3 + 2NaCl$$
$$N_3OC—D—CON_3 \xrightarrow{\Delta} OCN—D—NCO + 2N_2$$

The diisocyanates wherein $y$ is 1 are prepared by converting the dimeric fat acids to the corresponding dinitriles and then hydrogenating the dinitriles in the presence of ammonia and a catalyst such as Raney nickel to form diamines. The diamines are then reacted with phosgene to give the diisocyanates. This method of preparation can be conveniently illustrated by the following equations:

$$HOOC—D—COOH + 2NH_3 \xrightarrow{NH_3} NC—D—CN + 4H_2O$$
$$NC—D—CN + 4H_2 \xrightarrow{catalyst} H_2N—CH_2—D—CH_2NH_2$$
$$H_2NCH_2—D—CH_2NH_2 + COCl_2 \longrightarrow OCNCH_2—D—CH_2NCO + 2HCl$$

The dimeric fat acids, useful as the starting materials for preparing the above diisocyanates, are prepared by polymerizing ethylenically unsaturated monobasic carboxylic acids having 16 to 22 carbon atoms or the lower alkyl esters thereof.

The preferred acids are the mono and polyolefinically unsaturated 18 carbon atom acids. Representative octadecenoic acids are 4-octadecenoic, 5-octadecenoic, 6-octadecenoic (petroselinic), 7-octadecenoic, 8-octadecenoic, cis-9-octadecenoic (oleic), trans-9-octadecenoic (elaidic), 11-octadecenoic (vaccenic), 12-octadecenoic and the like. Representative octadecadienoic acids are 9,12-octadecadienoic (linoleic), 9,11-octadecadienoic, 10,12-octadecadienoic, 12,15-octadecadienoic and the like. Representative octadecatrienoic acids are 9,12,15-octadecatrienoic (linolenic), 6,9,12-octadecatrienoic, 9,11,13-octadecatrienoic (eleostearic), 10,12,14 - octadecatrienoic (pseudo-eleostearic) and the like. A representative 18 carbon atom acid having more than three double bonds is moroctic acid which is indicated to be 4,8,12,15-octadecatetraienoic acid. Representative of the less preferred (not as readily available commercially) acids are: 7-hexadecenoic, 9-hexadecenoic (palmitoleic), 9-eicosenoic (gadoleic), 11-eicosenoic, 6,10,14-hexadecatrienoic (hiragonic), 4,8,12,16-eicosatetraenoic, 4,8,12,15,18 - eicosapentanoic (timnodonic), 13-docosenoic (erucic), 11-docosenoic (cetoleic), and the like.

The ethylenically unsaturated acids can be polymerized using known catalytic or non-catalytic polymerization techniques. With the use of heat alone, the mono-olefinic acids (or the esters thereof) are polymerized at a very slow rate while the polyolefinic acids (or the esters thereof) are polymerized at a reasonable rate. If the double bonds of the polyolefinic acids are in conjugated positions, the polymerization is more rapid than when they are in the non-conjugated positions. Clay catalysts are commonly used to accelerate the dimerization of the unsaturated acids. Lower temperatures are generally used when a catalyst is employed.

The polymerization of the described ethylenically unsaturated acids yields relatively complex products which usually contain a predominant portion of dimerized acids, a smaller quantity of trimerized and higher polymeric acids and some residual monomers. The 32 to 44 carbon atom dimerized acids can be obtained in reasonably high purity from the polymerization product by vacuum distillation at low pressures, solvent extraction or other known separation procedures. The polymerization product varies somewhat depending on the starting fat acid or mixture thereof and polymerization tecnhique employed—i.e. thermal, catalytic, particular catalyst, conditions of pressure, temperature, etc. Likewise, the nature of the dimerized acids separated from the polymerization product also depends somewhat on these factors although such acids are functionally similar.

As a practical matter, the dimerized fat acids are preferably prepared by the polymerization of mixtures of acids (or the simple aliphatic alcohol esters—i.e. the methyl esters) derived from the naturally occurring drying and semi-drying oils or similar materials. Suitable drying or semi-drying oils include soybean, linseed, tung, perilla, oiticica, cottonseed, corn, sunflower, dehydrated caster oil and the like. Also, the most readily available acid is linoleic or mixtures of the same with oleic, linolenic and the like. Thus, it is preferred to use as the starting materials, mixtures which are rich in linoleic acid. An especially preferred material is the mixture of acids obtained from tall oil which mixture is composed of approximately 40–45% linoleic and 50–55% oleic, such percents being by weight. It is also to be understood that the said acids can be hydrogenated using palladium catalyst. Such mixture of hydrogenated dimeric fat acids was used in the preparation of the dimeryl diisocyanate used in the examples of the present invention.

The derivatives useful in the present invention are prepared from the described diisocyanates and a dialdimine or diketimine of a polyamine containing two primary amine groups and one secondary amine group. The preferred polyamines have the formula $$H_2N-R-\underset{H}{N}-R-NH_2$$

where R is a difunctional aliphatic group containing from 2 to about 48 carbon atoms. It is especially preferred that R is an alkylene group of 2–6 carbon atoms. Typical of the especially preferred polyamines are diethylene triamine, dipropylene triamine, dihexamethylene triamine and the like.

The polyamines are reacted with a carbonyl compound to yield the dialdimines or diketimines. The carbonyl compound has the following structural formula:

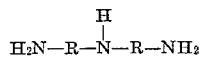

where $R_1$ and $R_2$ are organic radicals or hydrogen and are each substantially inert to the ketimine or aldimine formation reaction. At least one of the $R_1$ and $R_2$ groups must be an organic radical which is preferably a short chain alkyl group (1 to 6 carbon atoms). Preferred compounds are low molecular weight ($C_2$–$C_6$) aldehydes or ketones that are volatile so that an unreacted excess thereof may easily be removed by conventional distillation practices when the reaction is completed. It is often preferred to use a carbonyl compound which boils below or near the boiling point of water or which readily distills with water. The reaction of the carbonyl compounds with the polyamines can be illustrated as follows:

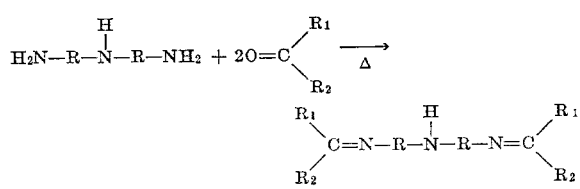

Preferred examples of the carbonyl reactants are such aldehydes and ketones as acetone, methylethyl ketone, diethyl ketone, methylpropyl ketone, methylisopropyl ketone, methylisobutyl ketone, methyl-n-butyl ketone, methyl-tert-butyl ketone, ethylisopropyl ketone, acetaldehyde, propionaldehyde, butyraldehyde, isobutyraldehyde, and the like. Especially preferred carbonyl compounds are acetone, methylethyl ketone and methylisobutyl ketone (i.e.:

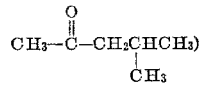

The derivatives are then prepared from the dialdimines or diketimines by mixing the same with the described diisocyanates in a reaction environment substatnially free of moisture. Where desired, the reaction mixture may be heated although the reaction is normally exothermic to a certain extent. The diisocyanate is used in an amount equivalent to the equivalents of free secondary amine group in the aldimine or ketimine. Thus the molar ratio will be 1:2 of diisocyanate to dialdimine or diketimine. The derivatives have the general formula:

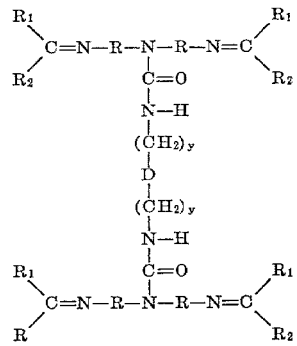

where y, R, $R_1$, $R_2$, and D are as above described.

A variety of polyisocyanates may be used in combination with the described derivatives. Representative polyisocyanates include the polymethylene diisocyanates such as ethylenediisocyanate, trimethylene diisocyanate, tetramethylenediisocyanate, pentamethylenediisocyanate, hexamethylenediisocyanate, etc.; other alkylene diisocyanates such as propylene-1,2-diisocyanate, butylene-1,2-diisocyanate, butylene-1,3-diisocyanate, butylene-2,3-diisocyanate, etc.; alkylidene diisocyanates, such as ethylidene diisocyanate, butylidene diisocyanate, etc.; cycloalkylene diisocyanates, such as cyclopentylene-1,3-diisocyanate, cyclohexylene-1,4-diisocyanate, 4,4'-diisocyanate bis(cyclohexyl) methane, etc.; cycloalkylidene diisocyanates, such as cyclopentylidene diisocyanate, cyclohexylidene diisocyanate, etc.; and triisocyanates such as 1,2,4-butanetriisocyanate, 1,3,3-pentanetriisocyanate, 1,2,2-butanetriisocyanate, etc.

Examples of araliphatic polyisocyanates useful in the present invention include the following: p-phenylene-2,2'-bis(ethylisocyanate), p-phenylene - 3,3' - bis(propylisocyanate), p-phenylene-4,4'-bis(butylisocyanate), m-phenylene - 2,2' - bis(ethylisocyanate), 1,4-naphthalene-2,2'-bis(ethylisocyanate), 4,4' - diphenylene-2,2'-bis(ethylisocyanate), 4,4'-diphenylene ether - 2,2' - bis(ethylisocyanate), tris(2,2',2''-ethylisocyanate benzene), 5-chlorophenylene-1,3-bis(propyl-3-isocyanate), and 5-methoxyphenylene-1, 3-bis-(propyl-3-isocyanate), etc.

Typical aromatic polyisocyanates which may be used include toluene diisocyanate, m-phenylene diisocyanate, p-phenylene diisocyanate, 1-methyl-2,4-phenylene diisocyanate, naphthalene-1,4-diisocyanate, diphenylene-4,4'-diisocyanate, etc.; aliphatic-aromatic diisocyanates such as xylylene - 1,4 - diisocyanate, xylylene-1,3-diisocyanate, and 4,4'-diphenylene-methane diisocyanate, etc.

One particularly preferred group of polyisocyanates useful in the present invention are those having the formula

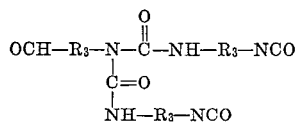

where $R_3$ is a divalent hydrocarbon radical of 2 to 10 carbon atoms which is preferably an alkylene radical such as ethylene, butylene, hexamethylene, octamethylene, decamethylene, and the like. It is especially preferred that $R_3$ is hexamethylene.

Another particularly preferred group of useful organic polyisocyanates are the diisocyanates derived from dimerized fat acids as described hereinabove.

The process of the present invention involves the impregnation of wood with a solvent solution of the polyisocyanate and the derivative. Such impregnation can be accomplished in various ways. Thus the solution can be brushed or sprayed onto the wood surface or surfaces. However, it is preferred that the wood article or portion thereof to be treated is immersed in the solution. In order to obtain a substantial stabilizing effect, the solution must penetrate at least the outermos $\frac{1}{16}$ in. of the wood. The penetration is normally $\frac{1}{8}$ to $\frac{1}{4}$ in. and on the end grains as well as on very porous woods may be much deeper or the same may be completely saturated with the solution. The duration of the impregnation is not critical so long as the requisite penetration is achieved.

The total weight concentration of the polyisocyanate and the derivative in the solution is above about 12.5 weight percent and below about 75 weight percent. Preferably, the total concentration of the polyisocyanate and derivative is in the range of about 15 to 50 weight percent based on the total solution. Below 12.5%, the stabilization improvement drops off sharply. Above 75%, the solution does not adequately penetrate the wood due to the viscous nature of the polyisocyanate and derivative. The equivalent ratio of the polyisocyanate to the derivative is about 1.5:1 to 1:1.5, such equivalents being based on the isocyanate groups of the polyisocyanate and the aldimine or ketimine groups of the derivative. It is preferred to use an equivalent ratio of approximately 1:1.

Any organic solvent which is substantially inert to reaction with isocyanates and is reasonably volatile under ambient conditions can be used in the practice of the present invention. Preferred solvents are the aromatic and aliphatic hydrocarbons such as benzene, xylene, toluene, n-hexane, mineral spirits and the like. Chlorinated hydrocarbons are also useful but less preferred due to the cost thereof.

The solution is preferably maintained out of contact with moisture at least until being used to treat the wood. In this respect, moisture or water causes the aldimine or ketimine groups of the derivative to unblock leaving the free aldehyde or ketone and free primary amine groups. It is often preferred to carry out the impregnation in an atmosphere free of moisture. In this way, the unblocking does not take place to any appreciable degree and thus there is little or no reaction in the solution between the polyisocyanate or unblocked derivative. Accordingly, as the solution is used up, more can be added without having to compleetly change the treating bath.

After the impregnation, the wood is desirably exposed to the atmosphere. The atmospheric moisture aids in the unblocking of the aldimine or ketimine groups of the derivative leaving free primary amine groups capable of reacting with the isocyanate groups of the diisocyanate. Of course, the wood being treated contains a certain amount of moisture which also allows the conversion of the aldimine or ketimine groups to free amine groups. Thus exposure of the impregnated wood to atmospheric moisture is not essential but is normal and desirable as it tends to speed the stabilization of the wood. The impregnated wood shows increased stability to moisture after a short period of time under ambient conditions—i.e., a few minutes. The use of heat is not normally necessary since the stabilizing reaction or reactions proceed at room temperature in the presence of moisture—from the wood, atmosphere, or any other source.

Any wood may be treated by my process. However, as indicated above, the process is particularly advantageous for the treatment of softwoods. The stabilized wood can also be coated with any protective resinous or non-resinous coating. Thus various paints, varnishes, shellacs and the like can be used. The base resinous material can be drying or semi-drying oils, acrylics, polyurethanes, polyureas, epoxy resins and the like.

The following examples illustrate certain preferred embodiments of the invention but are not to be considered as limiting.

EXAMPLE I

The following solutions were prepared:

(A) 65 g. of dimeryl isocyanate in 35 g. of mineral spirits.

(B) 60 g. of derivative in 40 g. of mineral spirits.

The dimeryl isocyanate had the structural formula $$OCNCH_2—D—CH_2NCO$$

where D is the divalent hydrocarbon radical of the dimerized acids prepared by polymerizing the mixture of acids obtained from tall oil in the presence of an alkaline montmorillonite clay with subsequent hydrogenation thereof using palladium catalyst. The derivative was prepared from the described diisocyanate and the diketimine made from diethylenetriamine and methylisobutyl ketone. It had the idealized formula:

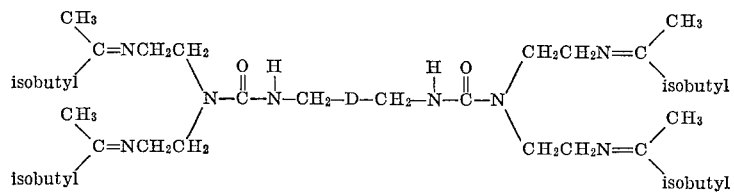

Equal volumes of the two solutions were mixed and then five 10″ long, 1½″ wide and ¼″ thick pieces of kiln dried ponderosa pine which had been conditioned at 60–70% relative humidity and 70–80° F. were immersed in the solution for 30 seconds. The impregnated pine pieces were air dried for over four days, following which they were conditioned at 60–70% R.H. and 70–80° F. The pieces along with five conditioned but untreated pieces were then tested for water repellency according to Federal Specification TT-W–572 (Feb. 29, 1952). Thus they were placed in a rack with one end stationary and the other butted against the pedestle of a sweep hand micrometer and the entire rack was immersed in a cylinder of distilled water. After 30 minutes immersion, the swelling of the pieces was measured and the percent efficiency calculated. Results were as follows:

| Sample pairs | Swelling (in.) untreated | Swelling (in.) treated | Difference (in.) | Percent efficiency |
|---|---|---|---|---|
| 1 | .408 | .006 | .402 | 98.5 |
| 2 | .409 | .000 | .409 | 100.0 |
| 3 | .403 | .004 | .399 | 99.0 |
| 4 | .404 | .005 | .399 | 98.8 |
| 5 | .406 | .003 | .403 | 99.3 |
|   |      |      |      | *99.1 |

*Average.

The above data show that the process of the present invention is highly effective in preventing swelling of wood due to moisture. Thus the treated pine pieces showed an average swelling of less than .004 inch in this test where swelling of less than 0.1 inch is considered very good. The treated pine piece of pair 5 above was immersed in the water for an additional 15 hours and still showed a swelling of only .107 inch or an efficiency of 73.6%.

EXAMPLE II

Example I was repeated except that after mixing, the combined solutions were diluted with an equal volume of toluene to give a dimeryl isocyanate and derivative weight percent of about 31 in the treating solution. Results were as follows:

| Sample pairs | Swelling (in.) untreated | Swelling (in.) treated | Difference (in.) | Percent efficiency |
|---|---|---|---|---|
| 1 | .408 | .042 | .366 | 89.7 |
| 2 | .409 | .027 | .382 | 93.4 |
| 3 | .403 | .026 | .377 | 93.5 |
| 4 | .404 | .031 | .373 | 92.3 |
| 5 | .406 | .057 | .349 | 86.0 |
|   |      |      |      | *91.0 |

*Average.

These data show that at reduced concentrations of diisocyanate and derivative the results are still outstanding. It is to be noted that comparable results have been obtained using 15 equivalent percent excess of either the diisocyanate or the derivative at similar overall solution concentrations. It is also to be noted that the use of a 50% by weight solution of the diisocyanate in toluene gave much lower results than the 31% solution of the combination of the diisocyanate and derivative. Thus the average swelling was .149 (percent efficiency only 62.7).

Efficiencies of over 90% have been obtained in tests as above using 20% by weight solutions of the combination of the above dimeryl isocyanate and the derivative. Additionally, the use of equivalent amounts of the said derivative and Desmodur N at a total concentration of 30% by weight in mineral spirits under essentially the same test conditions gave an efficiency of over 95%. Desmodur N is a triisocyanate of the formula:

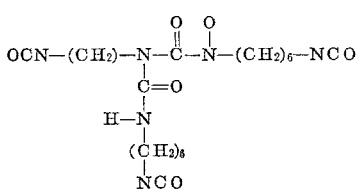

The embodiments of the invention in which an exclusive property or privilege is claimed are defined as follows.

I claim:

1. The process of treating wood which comprises impregnating the same to a depth of at least 1/16 inch with an organic solvent solution of an organic polyisocyanate and a derivative of the formula:

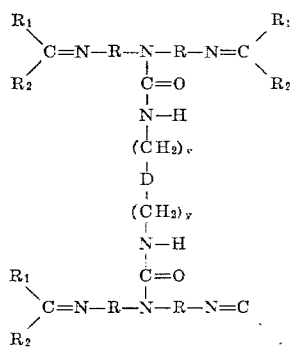

where y is 0 or 1, R is a divalent aliphatic group of 2 to about 48 carbon atoms, $R_1$ and $R_2$ are hydrogen or alkyl groups of 1 to 6 carbon atoms with the proviso that at least one of such groups must be an alkyl group and D is the divalent hydrocarbon group of dimeric fat acids obtained by polymerizing ethylenically unsaturated monobasic carboxylic acids having 16 to 22 carbon atoms, said polyisocyanate and derivative being used in an equivalent ratio of 1.5:1 to 1:1.5 based on the isocyanate groups of the polyisocyanate and the

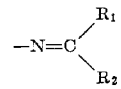

groups of the derivative and the total concentration of the polyisocyanate and derivative in the solution being in the range of about 12.5 to 75% by weight.

2. The process of claim 1 wherein the equivalent ratio of polyisocyanate to derivative is approximately 1:1.

3. The process of claim 1 wherein D is the divalent hydrocarbon group of dimerized acids obtained by polymerizing a mixture of 18 carbon atom fat acids rich in linoleic acid.

4. The process of claim 3 wherein the mixture of fat acids comprises 40–45% by weight linoleic acid and 50–55% by weight of oleic acid.

5. The process of claim 1 where y is 1.

6. The process of claim 1 wherein R is an alkylene group of 2–6 carbon atoms.

7. The process of claim 1 wherein the solvent is an aromatic hydrocarbon.

8. The process of claim 1 wherein the wood is a softwood and all of the surfaces thereof are impregnated with the solution by immersing the same in the said solution.

9. The process of claim 1 wherein the wood is air dried subsequent to the impregnation.

10. The process of claim 1 wherein the organic polyisocyanate is a diisocyanate of the formula:

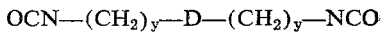

where y is 0 or 1 and D is the divalent hydrocarbon group of dimeric fat acids obtained by polymerizing ethylenically unsaturated monobasic carboxylic acids having 16 to 22 carbon atoms.

11. The process of claim 1 wherein the organic polyisocyanate is a triisocyanate of the formula:

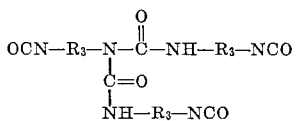

where $R_3$ is a divalent hydrocarbon radical of 2 to 10 carbon atoms.

12. The process of claim 1 wherein the wood is a softwood, the impregnation is carried out by immersing at least one surface of the softwood in the solution, the solvent is a hydrocarbon, the equivalent ratio of the polyisocyanate to the derivative is 1:1, the total concentration of the polyisocyanate and the derivative in the solution is in the range of about 15 to 50% by weight, the polyisocyanate is a diisocyanate of the formula:

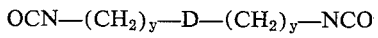

R is ethylene, $R_1$ is methyl, $R_2$ is isobutyl, the softwood is exposed to atmospheric moisture under ambient conditions subsequent to the impregnation and, in both the diisocyanate and the derivative, D is the divalent hydrocarbon group of dimerized fat acids obtained by polymerizing and hydrogenating a mixture of fat acids comprising 40–45% by weight linoleic acid and 50–55% by weight oleic acid and $y$ is 1.

13. The process of claim 1 wherein the wood is a softwood, the impregnation is carried out by immersing at least one surface of the softwood in the solution, the solvent is a hydrocarbon, the equivalent ratio of the polyisocyanate to the derivative is 1:1, the total concentration of the polyisocyanate and the derivative in the solution is in the range of about 15 to 50% by weight, R is ethylene, $R_1$ is methyl, $R_2$ is isobutyl, $y$ is 1, D is the divalent hydrocarbon group of dimerized fat acids obtained by polymerizing and hydrogenating a mixture of fat acids comprising 40–45% by weight linoleic acid and 50–55% by weight oleic acid, the polyisocyanate is a triisocyanate of the formula:

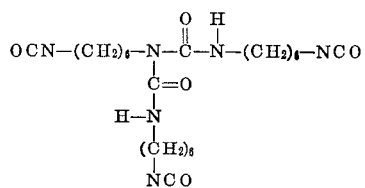

and the softwood is exposed to atmospheric moisture under ambient conditions subsequent to the impregnation.

14. The wood product prepared by the process of claim 1.

15. The wood product prepared by the process of claim 12.

16. The wood product prepared by the process of claim 13.

References Cited
UNITED STATES PATENTS

| | | | |
|---|---|---|---|
| 3,481,774 | 12/1969 | Kamal et al. | 117—148 |
| 2,762,721 | 9/1956 | Wells | 117—149 |
| 2,804,400 | 8/1957 | Kelly | 117—148 |
| 2,893,898 | 7/1959 | Evans | 117—148 |
| 3,190,767 | 6/1965 | Tomany | 117—148 |
| 3,248,371 | 4/1966 | Damusis | 260—77.5 |
| 3,406,134 | 10/1968 | Seiwert | 117—148 |
| 3,441,588 | 4/1969 | Wagner | 117—148 |
| 3,455,883 | 6/1969 | Kamal | 260—77.5 |

FOREIGN PATENTS

| | | |
|---|---|---|
| 671,042 | 9/1963 | Canada. |
| 720,121 | 10/1965 | Canada. |

WILLIAM D. MARTIN, Primary Examiner

W. R. TRENOR, Assistant Examiner

U.S. Cl. X.R.

117—148; 260—77.5

PO-1050
(5/69)

UNITED STATES PATENT OFFICE
CERTIFICATE OF CORRECTION

Patent No. 3,539,386          Dated   November 10, 1970

Inventor(s) Arthur G. Janssen

It is certified that error appears in the above-identified patent and that said Letters Patent are hereby corrected as shown below:

Column 2, line 14, "3PCl$_3$" should read --2PCl$_3$--; line 14, "2H$_3$PO" should read --2H$_3$PO$_3$--. Column 4, line 16, "substatn: should read --substantially--. Column 5, line 5, the left-har portion of the formula reading "OCH-R$_3$" should read --OCN-R$_3$-- line 26, "outermos" should read --outermost--. Column 8, lines 18-22, the lower right-hand portion of the formula read: "-N=C" should read

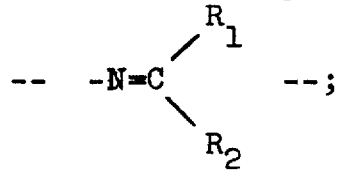

line 57, delete "of".

Signed and sealed this 20th day of April 1971.

(SEAL)
Attest:

EDWARD M. FLETCHER, JR.
Attesting Officer

WILLIAM E. SCHUYLER, JR.
Commissioner of Patents